July 25, 1933.    W. DE GROOT    1,919,932
GASEOUS ELECTRIC DISCHARGE DEVICE
Filed Jan. 12, 1933
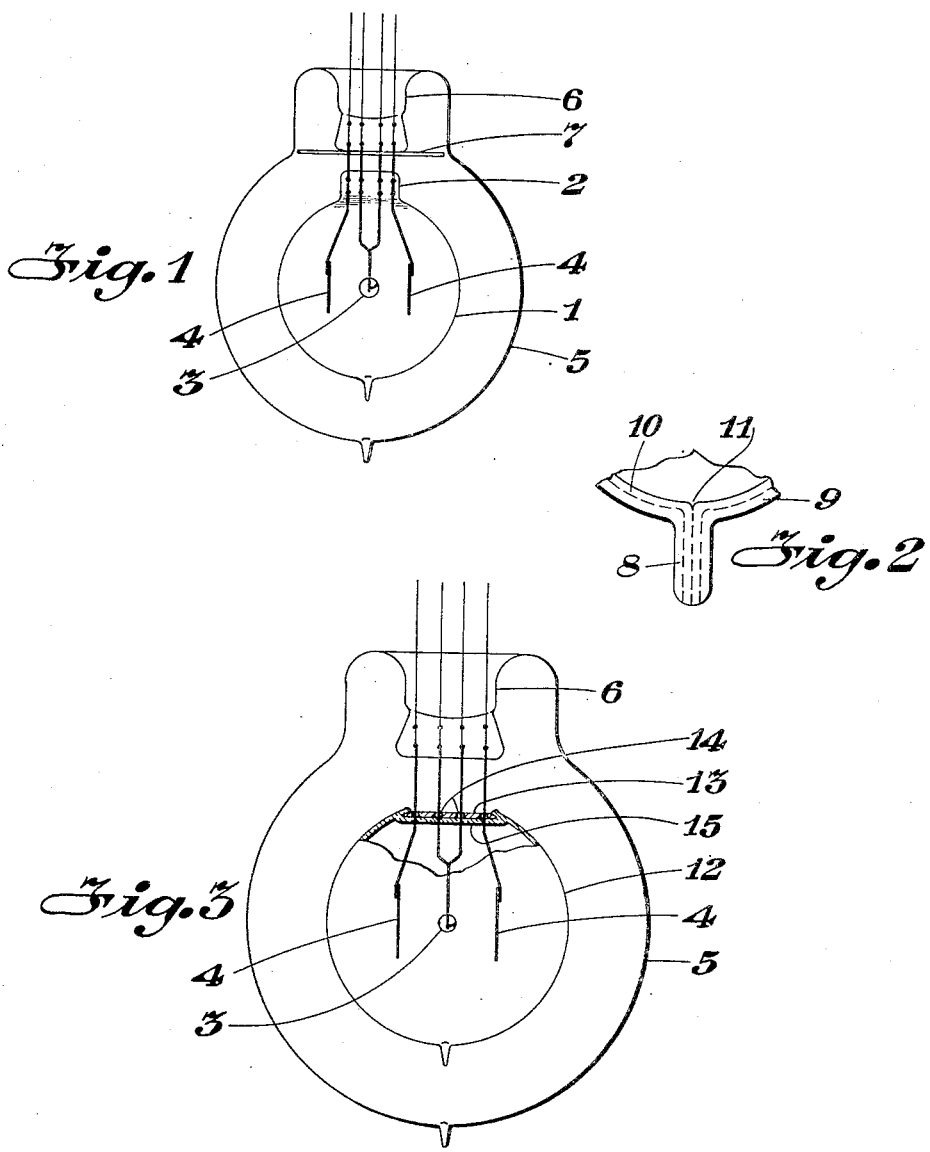
INVENTORS
Willem de Groot
BY Charles N. Mullan
ATTORNEY Patented July 25, 1933

1,919,932

UNITED STATES PATENT OFFICE

WILLEM DE GROOT, OF EINDHOVEN, NETHERLANDS, ASSIGNOR TO GENERAL ELECTRIC COMPANY, A CORPORATION OF NEW YORK

GASEOUS ELECTRIC DISCHARGE DEVICE

Application filed January 12, 1933, Serial No. 651,384, and in the Netherlands December 23, 1931.

The present invention relates to gaseous electric discharge devices generally and more particularly the invention relates to such devices the gaseous atmosphere of which comprises a metal vapor.

Metals such as sodium, potassium, rubidium, cadmium, magnesium and thallium are relatively hard to vaporize, that is, the vapor pressure of such metals at a temperature of 200° C. is only a fraction of a millimeter. In order to successfully employ such metals in the gaseous atmosphere of an electric discharge lamp device it is necessary, therefore, to maintain the temperature of the container of the device at a temperature greater than 200° C. The efficiency of the gaseous electric discharge device having a gaseous filling comprising a metal vapor depends upon the vapor pressure and prior electric lamp devices using vapors of the metals above enumerated have not attained maximum efficiency because the pressure of the metal vapor has been too low.

The object of the present invention is to provide a gaseous electric discharge device of such structure that the pressure of the metal vapor present in the gaseous atmosphere thereof is maintained at a high level. Still further objects and advantages attaching to the device and to its use and operation will be apparent to those skilled in the art from the following particular description.

The object of the invention is attained by making the container of the electric discharge device of such shape that all parts of said container are at approximately the same temperature during the operation of the device. The avoidance of cold spots on the container of the device is of great value in maintaining the vapor pressure at a high level as the vapor pressure corresponds to the lowest temperature of any part of the container as is well known in the art.

In the drawing accompanying and forming part of this specification two embodiments of the invention are illustrated, in which Fig. 1 is a front elevational view of one embodiment of the invention, Fig. 2 is a detail view of another embodiment of the invention showing a double wall structure of the container 1 of Fig. 1, and Fig. 3 is a front elevational view, partly in section of another embodiment of the invention illustrating a modified seal-in structure.

Like numbers denote like parts in all the figures.

Referring to Fig. 1 of the drawing the new and novel gaseous electric discharge device comprises a spherical container 1 made of an alkali metal vapor resistant, boro-silicate glass comprising a slight amount of silicic acid, $SiO_2$. Said container 1 has sodium vapor therein, or a gaseous atmosphere therein comprising a mixture of a metal vapor, such as sodium, and a rare gas, such as neon. The electrode leads for the electrodes 3 and 4 are sealed into the stem 2 of said container 1. Said stem 2 is located on the outside of said container 1 and as it is not exposed to the chemical effects of the sodium vapor in said container 1 it is made, when desired, of a different glass than the sodium vapor resistant, boro-silicate glass and of a glass, such as calcium glass, which fuses more readily to the metal current leads than does the boro-silicate glass of the container 1. The electrode 3 is a coiled, filamentary cathode which is electron emitting when heated and said electrodes 4 are sheet metal anodes. Said container 1 is enclosed in an envelope 5 having a re-entrant stem 6 in which the electrode leads for said electrodes 3 and 4 are sealed. These lead wires also support the container 1 inside the envelope 5, in fixed relation thereto. The space between said container 1 and said envelope 5 is evacuated, or, when desired, is filled with a gas having poor heat conductivity characteristics, such as argon or nitrogen. A shield 7 of mica, for example, is interposed between said stem 6 and said container 1 to protect said stem 6 from the heat generated by the discharge between said electrodes 3 and 4.

During the operation of the device all parts of the spherical container 1 are at approximately the same temperature. The use of an external stem avoids the cold spot at this part characteristic of prior devices and consequently the vapor pressure in the container of the device made in accordance with the present invention is higher than that of prior devices. The higher vapor pressure makes the present electric lamp device a more efficient light emitter than prior devices of the same type.

The stem of a container made of two glass layers is illustrated in Fig. 2. In such double layer containers it is the practice in the art to make the inner layer 10 of a glass resistant to the chemical effects of the gaseous filling, such as sodium vapor, in the container and the outer layer 9 is made of a different glass, usually a weather resistant glass. Said glass layer 9 can also be made of an infra-red ray absorbing glass to maintain the container 9, 10 at a high temperature. As shown in the drawing when the external stem 8 is formed the inner glass layer 10 seals itself at 11 to protect the outer glass layer from the chemical effects of the gaseous filling in said container 9. When desired, calcium glass, which fuses to the metal leads better than either of the container glasses and which is not resistant to sodium vapor can be used for the stem part 8, since said stem 8 is protected from the chemical effects of the sodium vapor by the above structure of the container 1.

The embodiment of the invention illustrated in Fig. 3 is similar to that shown in Fig. 1, but in this embodiment a chromium steel disc 13 is sealed into the container 12. Said container 12 is made of the sodium vapor resistant, boro-silicate glass similar to that discussed in connection with Fig. 1. The electrode leads for said electrodes 3 and 4 are sealed into openings in said disc 13 and insulated from said disc 13 by a quantity of glass 14 which fuses readily to the metal of said leads and said disc 13. The face of said disc 13 facing the discharge path between said electrodes 3 and 4 is covered with a layer 15 of the glass resistant to the chemical effects of the sodium vapor in said container 1. In other respects the construction of the electric discharge lamp device illustrated in Fig. 3 is the same as that illustrated in Fig. 1.

During the operation of the device the metal disc 13 aids in uniformly distributing the heat generated by the electric discharge between said electrodes 3 and 4 throughout the walls of said container 12 which maintains a high vapor pressure in said container so that the electric discharge lamp device operates at maximum efficiency.

While I have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention.

Reference is made to my co-pending application, Serial No. 651,385, filed Jan. 12, 1933, for a fuller explanation of the general principles of operation of the lamp of this invention.

What I claim as new and desire to secure by Letters Patent of the United States is:—

1. An electric discharge device comprising a container, electrodes sealed therein, a metal vapor therein, the interior of said container being approximately spherical in shape and having an inner wall layer of boro-silicate glass and an outer wall layer of glass absorbent to infra-red rays whereby all parts of said container are kept at approximately the same temperature to maintain a high metal vapor pressure in said container.

2. An electric discharge device comprising a container, electrodes sealed therein, an alkali metal vapor therein, the interior of said container being approximately spherical in shape and having an inner wall layer of boro-silicate glass and an outer wall layer of glass absorbent to infra-red rays whereby all parts of said container are kept at approximately the same temperature to maintain a high metal vapor pressure in said container.

3. An electric discharge device comprising a container, electrodes sealed therein, sodium vapor therein, the interior of said container being approximately spherical in shape and having an inner wall layer of boro-silicate glass and an outer wall layer of glass absorbent to infra-red rays whereby all parts of said container are kept at approximately the same temperature to maintain a high metal vapor pressure in said container.

4. An electric discharge device comprising a container, electrodes sealed therein, a gaseous atmosphere therein comprising a metal vapor, the interior of said container being approximately spherical in shape and having an inner wall layer of boro-silicate glass and an outer wall layer of glass absorbent to infra-red rays whereby all parts of said container are kept at approximately the same temperature and an envelope for said container to reduce the radiation of heat from the walls of said container to a minimum and to maintain a high metal vapor pressure in said container.

5. An electric discharge device comprising a container, electrodes and electrode leads sealed therein, a gaseous atmosphere therein comprising a condensible gas, and a metal disc fused into the wall of said container, said electrode leads being led through said disc and insulated therefrom, and an envelope for said container.

6. An electric discharge device comprising a container, electrodes therein sealed through a stem exterior to the space enclosed by the container, an envelope surrounding the container and spaced therefrom provided with a re-entrant stem opposed to the container stem, and a baffle plate disposed between the said stems, as a heat control barrier.

7. In an electric discharge device, a container, a gaseous atmosphere therein comprising a condensible gas, a stem in the wall of the container outside the space enclosed by the container, an envelope for the container provided with a re-entrant stem opposed to said container stem, electrodes in said container, and electrode leads sealed through said stems serving to hold the container substantially in the center of the envelope.

8. An electric lamp comprising an envelope provided with a re-entrant stem, a container inside said envelope, the envelope and container being substantially spherical, and rigid metal leads fused through said stem and through the wall of the container, said leads serving to supply current to the lamp container and to hold the container and its envelope in fixed relation to each other.

WILLEM DE GROOT.